(No Model.)
I. F. BAKER.
ELECTRIC RAILWAY CAR MOTOR.
No. 440,686. Patented Nov. 18, 1890.
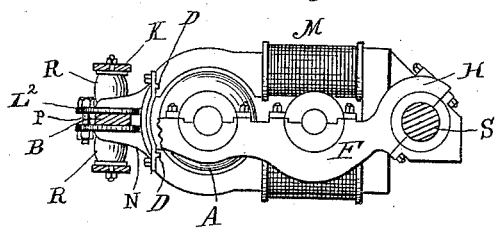
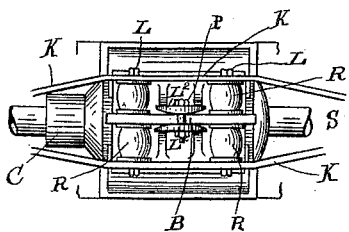
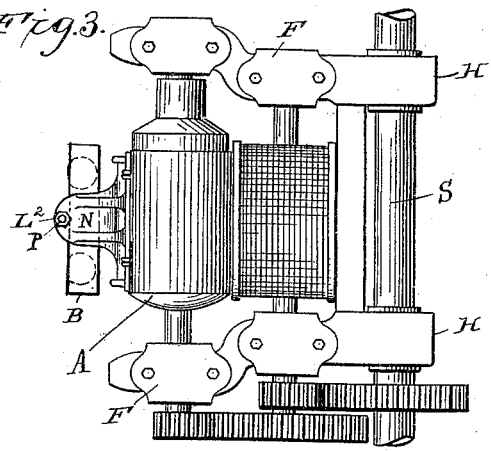
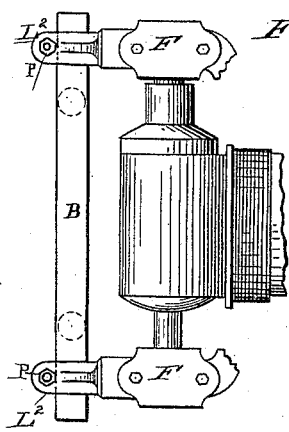
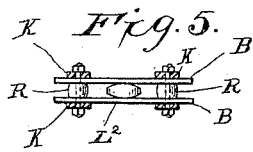
Witnesses:
W. E. Bowen
Fr. H. Capel
Inventor
Isaac F. Baker.
By H. C. Townsend
Atty

UNITED STATES PATENT OFFICE.

ISAAC F. BAKER, OF LYNN, MASSACHUSETTS, ASSIGNOR TO THE THOMSON-HOUSTON ELECTRIC COMPANY, OF CONNECTICUT.

ELECTRIC RAILWAY-CAR MOTOR.

SPECIFICATION forming part of Letters Patent No. 440,686, dated November 18, 1890.

Application filed July 1, 1889. Serial No. 316,213. (No model.)

*To all whom it may concern:*

Be it known that I, ISAAC F. BAKER, a subject of the Queen of Great Britain, and a resident of Lynn, in the county of Essex and State of Massachusetts, have invented a certain new and useful Electric Railway-Car Motor, of which the following is a specification.

The present invention relates to the means of attaching or supporting electric motors applied to the propulsion of vehicles—such, for instance, as street-railway cars, tram-cars, &c.

The object of the invention is to overcome some of the difficulties hitherto encountered in the operation of such motors by reason of the method of mounting employed in attaching the motors to the axle of the truck or vehicle.

My invention consists, broadly, in sleeving the motor or a part attached thereto to the car-axle at one end, and supporting the motor at its opposite end by means of an elastically-sustained bar or support, which is engaged by a lip or projection upon the motor or motor-frame, said lip or projection being capable of sliding freely on said bar or support.

My invention also consists in certain other improvements of construction, which will be more particularly referred to in the description of the figures.

One advantage secured by my invention is that the motor is at all times free to move in perfect unison with the axle, thereby preserving the proper relation of the gearing or other mechanism employed in reducing the speed from the armature-shaft of the motor to the axle of the vehicle and transmitting the power.

Another advantage secured by the construction devised by me is that the motor mechanism is free from all strains, which strains are always produced when the motor is supported at different points, one movable with reference to the other.

Still another advantage secured by my invention is the reduction of the wearing parts in the motor mechanism, which parts are expensive and difficult to replace when their usefulness is expended.

Figure 1 is a side elevation of the electric motor and support therefor of my invention. Fig. 2 is a front view of the same. Fig. 3 is a top view. Fig. 4 illustrates a modified construction, which may be employed in some instances. Fig. 5 illustrates a modification.

In Fig. 1, S is the axle of a street-railway car or of a tram-car or other suitable carriage for the propulsion of which electric motors are used. M is an electric motor, one end of which, as indicated, is made to engage or embrace the axle S by suitable boxes H H, extending from the frame F of the motor. The armature A and intermediate gearing from its shaft for the reduction of the speed are supported from the frame, as usual. Extending from the opposite end of the motor and forming part thereof, preferably from its pole-pieces, is a piece N, made of some material having no capacity for the conveyance of magnetism or being non-magnetic in its character—such, for instance, as brass or gun-metal—which piece is secured to the pole-faces by bolts, as shown, or in any other manner which will hold it rigidly and securely in position. The piece N is provided with lips $L^2$, between which lips a supporting-bar B, carried by the truck-frame or other part, passes; but the bar and lips are entirely free and independent of each other and without mechanical connection, being merely held in position by gravity and capable of a limited movement in any direction relatively to each other. The bar B is preferably, though not necessarily, elastically supported between springs or other devices—such as blocks or cushions R of rubber—in order to avoid the ill effects of sudden jars or shocks given to the vehicle in its passage over the road or track. The lips $L^2$ need not be made to closely encompass the bar B; but sufficient room may be provided for a slight vertical movement. The inner surfaces of the lips $L^2$ are also made, preferably, slightly rounding, as indicated in Fig. 2, this form of bearing-surface allowing greater freedom of motion than if the surfaces of the lips $L^2$ and bar B were in parallel planes. It is of course self-evident that the lips or projections $L^2$ need not necessarily be supported from the poles of the motor, as the arrangement could readily be reversed and the same results obtained—that is, a lip or projection from the bar B might enter into an opening or recess provided in a piece attached to the polar faces of the motor M, or a single lip or projection L² be employed instead of two, as shown in Fig. 5, and retained in position between two bars B. The construction first mentioned is, however, preferred as being the easiest to manufacture.

The manner of mounting the bar between blocks or cushions R is shown more clearly in Fig. 2 and in Fig. 5, where two bars or supports are employed. The cushions R are strung upon bolts L, which pass from one side or the other of the hollow frame K, forming a part of or carried by the truck-frame, or otherwise mounted or supported. The bar B is strung upon said bolts, but between the upper and lower cushions or blocks R. In Fig. 5, instead of using two sets of blocks or cushions, a single set may be used, placed between the two bars B, with the same effect as in the case of the two sets of cushions shown in Fig. 2. As will be obvious, a cushioning action is obtained against sudden jars or jolts or shocks in both an upward or downward direction.

Fig. 4 illustrates a modification of my invention in which the lips L² are not supported from the polar faces of the motor M, but are supported from the parts of the motor-frame, as shown. This method of support also allows a movement of the motor rigidly attached to the axle of the vehicle in a plane parallel to the truck and secures the advantages mentioned, as found in the construction, Figs. 1, 2, and 3, but perhaps not to so great a degree.

It is found in practice that if the armature end of the motor is rigidly attached by means of bolts to the car-frame or truck-frame, the bolts are usually sheared off, even when made of very heavy and strong materials. This damage is occasioned by the fact that there is a certain amount of lost motion in the different bearing-surfaces of the vehicle—such as the journal-boxes, &c.—and when the brakes are applied to stop the vehicle the trucks stop first, while the car, which may be heavily loaded with passengers, and the truck-frame tend to continue in motion by their inertia, and thus a very great strain is brought to bear upon the bolts mentioned. This difficulty is entirely obviated by freely supporting the end of the motor opposite that supported by the axle in such way that the motor and its support or bearing are free to move with relation to one another in a horizontal plane, as described.

In order to prevent spreading of the lips or projections L², Fig. 1, it is advisable to unite their outer ends by a bolt P, as shown. It is also well to provide the block or piece of metal N carrying said projections with lugs D D, Fig. 1, which project into the poles of the motor and support such block to prevent the shearing off of the bolts used in fastening it to the pole-pieces.

What I claim as my invention is—

1. The combination, with a railway car or vehicle, of a propelling electric motor therefor sleeved at one end upon the railway-car axle and supported at its opposite end by a slide free to move in a longitudinal direction and having a rounded bearing-surface.

2. The combination, with an electric railway motor, of a bearing or bearings B, upon which the motor rests freely at the other end, and rubber elastic cushions or blocks for said bearings.

3. The combination, with an electric railway motor, of a support B, upon which the motor bears and with reference to which it is free to move in a longitudinal plane, a frame or support K, bolts L, and cushions R, as and for the purpose described.

4. The combination, with an electric railway motor sleeved at one end upon the car-axle, of lips or projections projecting from the motor or frame thereof at the opposite end and a horizontal bar or support upon which said lip or lips rest freely, so as to be capable of horizontal movement with relation to such bar, as and for the purpose described.

5. The combination, with an electric railway motor sleeved at one end upon the car-axle, of an elastically-supported bearing B at the other, and a projection or projections from the motor or its frame resting freely on such bearing, as and for the purpose described.

6. The combination, with an electric railway motor having a sleeve-support at one end upon the car-axle, of an elastically-sustained bar or support engaged by a part fixed to the motor or motor-frame and upon which said part may slide freely in a horizontal direction.

7. The combination, with an electric railway motor, of a sustaining-bar or support B, elastically supported on the truck-frame and engaged at opposite sides by lips or projections from the motor or motor-frame.

8. The combination, with an electric railway motor, of an elastically-sustained bearing or support therefor, with reference to which the engaging portions of the motor may slide freely.

Signed at Lynn, in the county of Essex and State of Massachusetts, this 27th day of June, A. D. 1889.

ISAAC F. BAKER.

Witnesses:
JOHN W. GIBBONEY,
E. W. RICE, Jr.